United States Patent [19]

Brown

[11] Patent Number: 5,685,619

[45] Date of Patent: Nov. 11, 1997

[54] ENERGY MANAGEMENT METHOD FOR A TRACTION CONTROL SYSTEM

[75] Inventor: Ronald D. Brown, Peoria, Ill.

[73] Assignee: Catepillar Inc., Peoria, Ill.

[21] Appl. No.: 604,538

[22] Filed: Feb. 21, 1996

[51] Int. Cl.$^6$ ................................................. B60T 8/58
[52] U.S. Cl. .......................... 303/145; 188/1.11; 303/191
[58] Field of Search ............................ 303/145, 191, 303/166, 167; 188/1.11, 1.11 E

[56] References Cited

U.S. PATENT DOCUMENTS

| | | | |
|---|---|---|---|
| 5,136,508 | 8/1992 | Bannon et al. | 364/426 |
| 5,159,991 | 11/1992 | Tsuyama et al. | 180/197 |
| 5,265,693 | 11/1993 | Rees et al. | 180/197 |
| 5,351,795 | 10/1994 | Dadel et al. | 477/96 |
| 5,390,120 | 2/1995 | Caron et al. | 364/424.04 |
| 5,524,974 | 6/1996 | Fischle et al. | 188/1.11 X |

*Primary Examiner*—Robert J. Oberleitner
*Assistant Examiner*—Pamela J. Lipka
*Attorney, Agent, or Firm*—David M. Masterson

[57] ABSTRACT

A method for reducing the brake pressure commanded by a traction control system of a machine is disclosed. The method includes the steps of estimating the instantaneous heat energy associated with an applied brake, estimating the accumulated heat energy associated with the applied brake during the time period that the brake is applied in response to the instantaneous heat energy; comparing the accumulated heat energy to a maximum allowable heat energy value; and reducing the magnitude of the braking command signal to reduce the applied brake pressure in response to the accumulated heat energy being greater than the maximum allowable heat energy value.

4 Claims, 3 Drawing Sheets

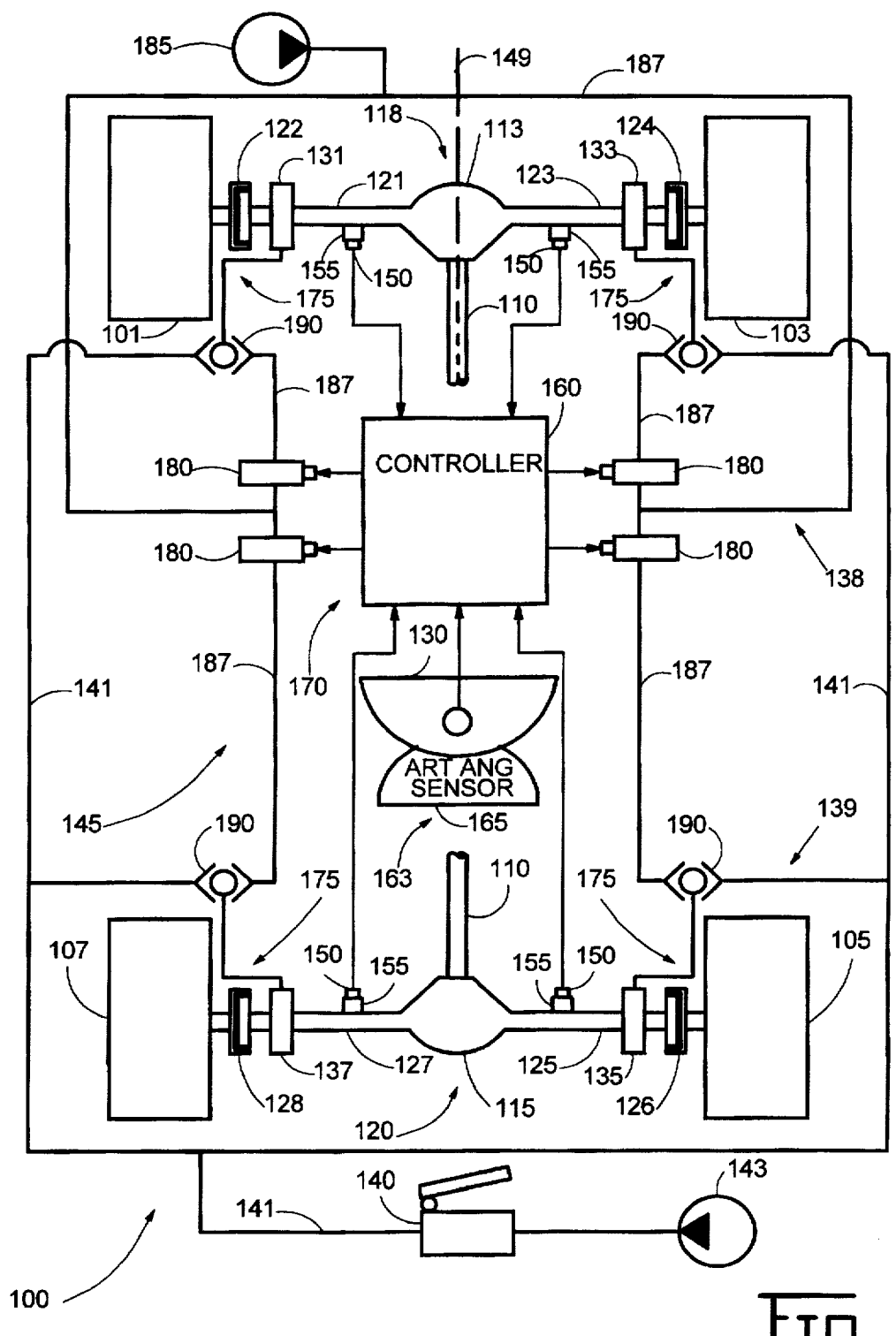
Fig-1-

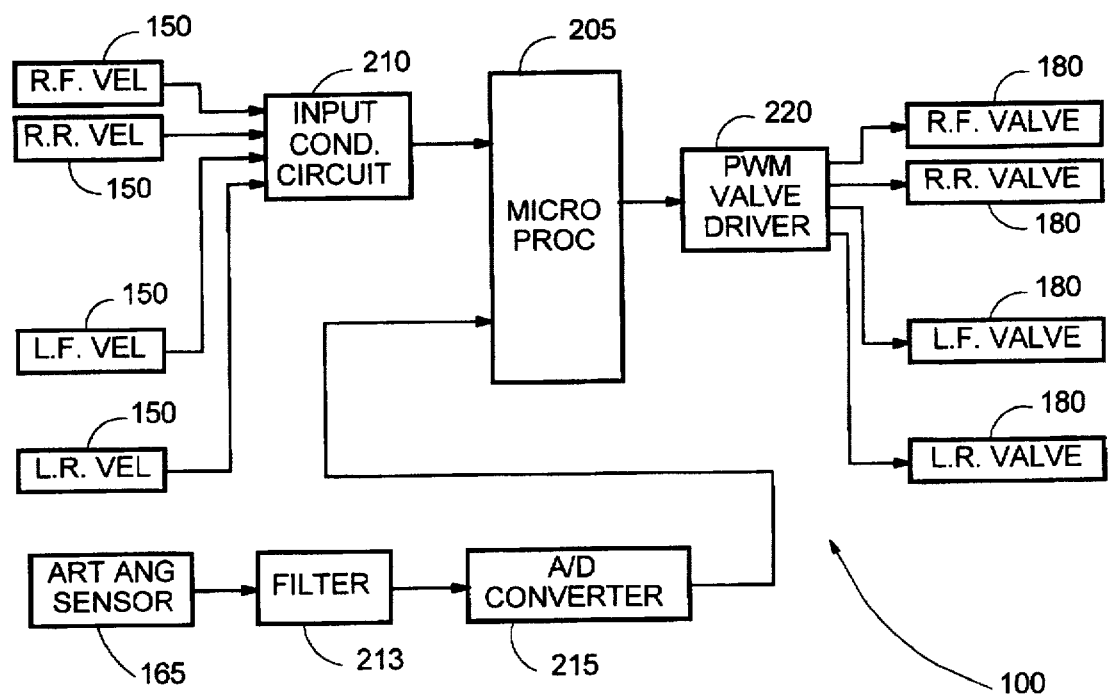
Fig_2_

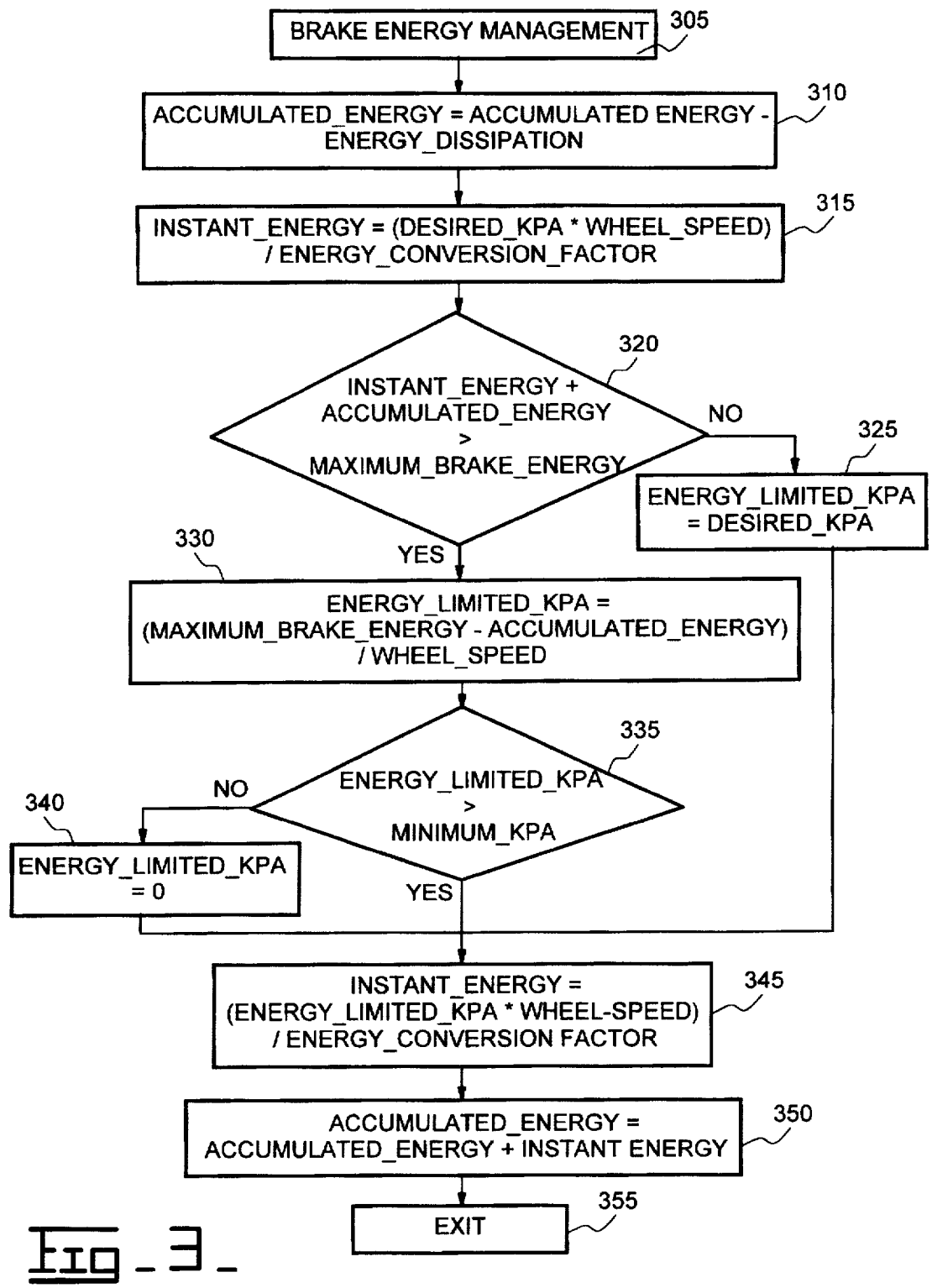
Fig-3-

ENERGY MANAGEMENT METHOD FOR A TRACTION CONTROL SYSTEM

TECHNICAL FIELD

This invention relates generally to a method for reducing the braking force during a traction control condition and, more particularly, to a method for reducing a braking command signal in response to the heat energy of an applied brake being greater than a maximum allowable value.

BACKGROUND ART

Machines used in construction sites and other off-road locations generally experience loss of traction. Moreover, four wheel drive machines used in these locations also experience traction loss. For example, slipping occurs to either the front wheels or rear wheels, or to all four wheels.

For example, a machine typically used on construction sites is a wheel loader. Wheel loaders commonly have four driven wheels and are often articulated. As is well known, an articulated machine includes front and rear body parts hinged together by an articulation joint for relative movement about a horizontal axis. Each body part includes a wheel set. When one of the body parts move relative to the other the machine turns. During normal operation a wheel loader will experience wheel-slip to all four wheels, especially when loading.

To alleviate such problems, various automated traction control systems have been developed. For example, some traction control systems apply a braking force to the spinning or slipping wheel to effect a balance of power through the differential mechanism. The application of the braking force to the slipping wheel simulates increased traction and results in a more even distribution of power between the differentially driven wheels. However, possible damage to costly brake components may occur due to excessive braking.

One scenario where excessive braking may occur, for example, in a situation where the wheel loader is being used to plow snow. In this example, the left wheels of the wheel loader are traveling on dry pavement while the right wheels are traveling on ice and snow. In order to keep the wheel slip to a minimum, the traction control system may continually apply the right set of brakes. However, this may result in excessive brake heating which would cause the brakes to become damaged. The present invention is directed to overcoming such a problem.

DISCLOSURE OF THE INVENTION

In one aspect of the present invention, a method for reducing the brake pressure commanded by a traction control system of a machine is disclosed. The method includes the steps of estimating the instantaneous heat energy associated with an applied brake, estimating the accumulated heat energy associated with the applied brake during the time period that the brake is applied in response to the instantaneous heat energy; comparing the accumulated heat energy to a maximum allowable heat energy value; and reducing the magnitude of the braking command signal to reduce the applied brake pressure in response to the accumulated heat energy being greater than the maximum allowable heat energy value.

BRIEF DESCRIPTION OF THE DRAWINGS

For a better understanding of the present invention, reference may be made to the accompanying drawings in which:

FIG. 1 shows a schematic view of a machine drive system including a traction control system;

FIG. 2 shows a block diagram of the electronic circuitry associated with the traction control system; and FIG. 3 shows a flowchart of an energy management method associated with the traction control system.

BEST MODE FOR CARRYING OUT THE INVENTION

Referring first to FIG. 1, an automated traction control system 100 embodying certain principles of the present invention is illustrated. Wheels 101,103,105,107 are driven by an engine (not shown) through an input or drive shaft 110, respective differential mechanisms 113,115 and respective axle sets 118,120 which include half-axles 121,123,125,127 and final drive assemblies 122,124,126,128, respectively. The axle sets 118,129 also include braking mechanisms 131,133, 135,137 connected between the respective differentials and final drive assemblies. The axle set may have "inboard" or "outboard" brake and final drive assemblies. For example and as shown in FIG. 1, the outboard assembly includes the braking mechanism and the final drive assembly in close proximity to the wheel with the half-axle connected between the differential and the braking mechanism. Alternatively, the inboard assembly (not shown) includes the braking mechanism and final drive in close proximity to the differential with the half-axle connected between the final drive and the wheel. The drive systems disclosed are conventional and no further details need be disclosed for an understanding of the present invention.

The machine is articulated and includes front and rear wheeled sections 138,139 hinged together by an articulation joint or mechanism 130 for relative movement about an horizontal axis 149, thus enabling the machine to be steered.

The wheels 101,103,105,107 are stopped by hydraulically engaged service brake pistons, of braking mechanisms 131, 133,135,137 connected between the respective differentials and final drive assemblies. The brakes may be spring-biased in the engaged position and maintained in the disengaged position by application of fluid pressure. Alternatively, the brakes may also be maintained in the engaged position by the application of fluid pressure and spring-biased in the disengaged position. The method of engaging the brakes will vary from machine to machine and is not critical to the present invention. The service brakes are normally actuated by a brake pedal 140 via a service brake line 141 connected to the service brake and retarder master cylinders (not shown). The fluid is pressurized and is supplied by the service pump 143. The service brake system is well known and does not form a part of this invention.

Means 145 produces a slip signal having a value responsive to the difference in rotational velocity between the wheels of each axle set. As shown and in the case of the outboard axle design, the slip signal producing means 145 includes a wheel speed pickup in the form of a Hall effect device 150 which provides pulses in cooperation with a gear-like device 155. The device 155 is mounted on each axle portion 121,123,125,127. Alternately, in the case of the inboard axle design (not shown), the transducer 150 is mounted on the braking mechanism and the device 155 is machined into the circumference of a brake disk and rotates therewith. In either case, the signals from the transducer 150 are applied to one input of an electronic controller 160, the details of which are described below.

Each transducer 150 produces respective signals having values responsive to the rotational speed or velocity of the wheels 101,103,105,107. All the wheel speed signals for each wheel 101,103,105,107 are provided in a similar manner. Moreover, the wheel speed signals for each wheel are applied to an input of the electronic controller 160. For example, each transducer 150 is preferably an Hall effect device. The transducer 150 produces a pulse-type, time variable output voltage. Such transducers are well known in the art. However, other transducers, such as optical and electromagnetic devices, may be employed as alternatives.

Means 163 produces an articulation signal having a value responsive to the angle of articulation of the machine. Means 163 preferably includes a potentiometer 165 controllably connected to the articulation mechanism 130. The output of the potentiometer 165 is a signal that is pulse width modulated in response to the position of the articulation mechanism 130. For example, the potentiometer 165 is adapted to measure 100 radial degrees. Other suitable angular position transducers may be substituted for the potentiometer 165 in the means 163, as is well known in the art.

The electronic controller 160 is part of a control means 170 which receives the slip signal and the articulation signal. The control means 170 produces a braking command signal in response to the slip signal and articulation signal. A braking means 175 controllably applies braking forces to each of the driven wheels 101,103,105,107. More particularly, the braking means 175 receives the braking command signal and controllably operates the braking mechanisms 131,133,135,137 in response to the received braking command signal to regulate the wheel slip of the machine during a loss of traction situation.

The controller 160 operates upon the signal inputs, determines the existence, magnitude, and location of wheel-slip during a loss of traction situation, and distinguishes between true wheel-slip and a transducer failure. In response to detecting a true slip condition, the power transfer between two differentially driven wheels is balanced by applying a proportional braking force to the wheel which loses traction, i.e. the faster rotating wheel. This is accomplished with the braking means 175, and more particularly, the selection of electrohydraulic control valves 180.

The electrohydraulic control valves 180 operate in combination with a supply pump 185, which may be part of the service pump 143. The supply pump 185 supplies pressurized oil or brake fluid. Fluid lines 187 from the pump 185 run through the hydraulic valves 180 and check valves 190 directing pressure to one of the braking mechanisms 131, 133,135,137 under modulated or proportionally controlled pressure. The check valves 190 are ball-type check valves and the electrohydraulic brake valves are solenoid operated three-way valves; both types of valves are well known in the art and will not be further discussed.

FIG. 2 is a block diagram of the automated traction control system 100 described above. A microprocessor 205 performs system control functions. The microprocessor 205 is supplied by Motorola as Part No. 68HC11, for example. However another microprocessor, such as Motorola's No. 6809, may be substituted as one skilled in the art can readily appreciate. Transducers 150 which supply the wheel speed signals are connected to the microprocessor 205 through an input conditioning circuit 210. The input circuit 210 provides appropriately digitized input signals to the microprocessor 205. The articulation angle sensor 165 is connected to a low pass filter 213 through an A/D converter 215 to the microprocessor 205.

A first output of the microprocessor 205 is connected through a pulse-width modulated servo valve driver 220 associated with each electrohydraulic control valve 180. The pulse-width modulated servo valve drivers 220 receive the braking command signal produced by the microprocessor 205 and proportionally controls the respective electrohydraulic valves 180 in response to the braking command signal. The duty cycle of the braking command signal varies in response to the slip signal. Advantageously, the applied braking forces are modulated in response to the modulation or duty cycle of the braking command signal. For example, the microprocessor 205 controls the energization of the electrohydraulic brake valves 180 via the braking command signal providing pressurized fluid to the respective service brakes.

The present invention is directed toward a brake energy management method that limits the desired braking force or pressure to levels that reduce the heat generated by the application of a brake. Limiting the braking force reduces brake fatigue, thus extending the lifetime of the brake. As will be described, the brake energy management method determines or estimates the amount of energy that will be produced by an applied brake, and limits the brake force or pressure if the estimated energy is greater than a maximum allowable value. The brake energy management method is represented by the flowchart shown in FIG. 3. The flowchart represents computer software logic for implementing the preferred embodiment of the present invention. The program depicted on the flowchart is adapted to be utilized by any suitable microprocessor system. The program may be one of many automated traction control subroutines that is called by an executive or main loop program.

Preferably, the subroutine is executed every 20 milliseconds during a traction control condition. Program control begins at block 305 and proceeds to block 310 where a variable referred to as ACCUMULATED_ENERGY is adjusted or modified based on the amount of energy that is dissipated into the atmosphere. The variable ACCUMULATED_ENERGY represents the subtotal or accumulation of heat energy (in Joules) that results from a brake being applied to a particular wheel during a traction control operation. The energy that is dissipated into the atmosphere is represented by a constant ENERGY_DISSIPATION and the constant is subtracted from the variable ACCUMULATED_ENERGY. ENERGY_DISSIPATION is experientially determined and represents the amount of energy that is dissipated into the atmosphere from the application of a brake to a wheel. Note that, if the calculation in block 310 results in ACCUMULATED_ENERGY having a negative value, then the program limits the value of ACCUMULATED_ENERGY to a value no less than zero.

The instantaneous brake energy, INSTANT_ENERGY, is then estimated at block 315. The variable INSTANT_ENERGY represents the instantaneous amount of energy (in Joules) that would likely be produced by the applied brake during the current program loop. The variable INSTANT_ENERGY is the product of DESIRED_kPA, which represents the magnitude of the desired braking command signal in kPA, and WHEEL_SPEED, the current speed of the particular wheel. The product is then divided by an ENERGY_CONVERSION_FACTOR. The ENERGY_CONVERSION_FACTOR is a value that represents the machine constants that relate energy to wheel speed and brake pressure. The ENERGY_CONVERSION_FACTOR is a mathematically determined value which may vary depending on the type of machine. Such a value may be determined by methods well known in the art.

At the first decision block 320, the program determines whether the ACCUMULATED_ENERGY plus the INSTANT_ENERGY is greater than a constant referred to as MAXIMUM_BRAKE_ENERGY. MAXIMUM_BRAKE_ENERGY is an experientially determined value which represents a maximum desired accumulated energy level for an applied brake at which no brake damage should occur. If the ACCUMULATED_ENERGY plus INSTANT_ENERGY is less than the MAXIMUM_BRAKE_ENERGY, then ENERGY_LIMITED_kPA, which represents a limited or reduced braking command signal, is set equal to DESIRED_kPA, the desired braking command signal, at block 325. However, if the ACCUMULATED_ENERGY plus INSTANT_ENERGY is greater than the MAXIMUM_BRAKE_ENERGY, then the limited braking command signal, ENERGY_LIMITED_kPA, is limited or reduced by an acceptable amount, as shown in block 330.

The program control then continues to the second control block 335 where the program determines whether the limited braking command signal, ENERGY_LIMITED_kPA, is greater than a minimum braking command signal magnitude, MINIMUM_kPA. MINIMUM_kPA is an experientially determined value which pressure. If the desired brake pressure. If the limited braking command signal, ENERGY_LIMITED_kPA, is less than the minimum braking command signal magnitude, MINIMUM_kPA, then the limited braking command signal magnitude, ENERGY_LIMITED_kPA, is set to zero at block 340. Thus, relatively small braking command signal magnitudes that cause brake friction but little braking action are not allowed.

The program control continues to block 345 where the INSTANT_ENERGY is recalculated in response to the reduced braking command signal, ENERGY_LIMITED_kPA, as shown in block 345. The subtotal or accumulated amount of heating energy caused by the applied brake is then determined at block 350 where ACCUMULATED_ENERGY is set equal to ACCUMULATED_ENERGY+INSTANT_ENERGY. Finally, the program control exits at block 355.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is well suited toward regulating the wheel-slip of an articulated machine such as a wheel loader, for example, wheel loader provided by Caterpillar, Inc. as model no. 966F. It will however, be apparent to those skilled in the art that the present invention is not limited to a wheel loader, as the present invention is well suited to many other types of articulated machines.

The traction control system reads the individual wheel speeds, the articulation angle, and determines a braking command signal that represents positive or negative braking forces that equalize the torque on a respective wheel set. Preferably, the traction control is a PID system where the brake forces are incrementally modulated for each control loop to provide for smooth transitions from an initial braking force to a final braking force.

When a braking force is applied to a wheel, the energy that is converted into heat is computed for each control loop. This instantaneous or instant energy is added to the subtotal or accumulated energy for each wheel, while additionally subtracting the energy that is dissipated into the atmosphere. If the accumulated energy is found to exceed a maximum allowable amount of accumulated energy, then the braking control signal magnitude is limited so that the brake energy will be equal or less than the allowable accumulated energy level.

Other aspects, objects and advantages of the present invention can be obtained from a study of the drawings, the disclosure and the appended claims.

I claim:

1. A method for reducing the brake pressure commanded by a traction control system of a machine having at least two driven wheels with associated brake sets, comprising the steps of:

applying a brake to a driven wheel in response to a braking command signal;

estimating the instantaneous heat energy associated with the applied brake;

estimating the accumulated heat energy associated with the applied brake during the time period that the brake is applied in response to the instantaneous heat energy;

comparing the accumulated heat energy to a maximum allowable heat energy value;

determining the wheel speed of the braking wheel;

subtracting the accumulated energy value from the maximum allowable brake energy value;

dividing the result by the wheel speed of the braking wheel; and reducing the magnitude of the braking command signal to reduce the applied brake pressure in response to setting the braking command signal magnitude to the result of the division step.

2. A method, as set forth in claim 1, wherein the step of estimating the accumulated energy includes the steps of:

estimating the energy dissipated into the atmosphere from the applied brake; and subtracting the dissipated energy from the accumulated energy.

3. A method, as set forth in claim 2, wherein the step of estimating the instantaneous energy includes the steps of;

determining the corresponding brake pressure associated with the braking command signal; and multiplying the wheel speed by the brake pressure associated with the braking command signal.

4. A method, as set forth in claim 3, including the steps of:

comparing the reduced braking command signal magnitude to a minimum allowable brake pressure; and limiting the reduced braking command signal magnitude to a predetermined value in response to the reduced braking command signal magnitude being less than the minimum allowable brake pressure.

* * * * *